United States Patent
Baba et al.

(10) Patent No.: US 9,555,798 B2
(45) Date of Patent: Jan. 31, 2017

(54) DRIVE APPARATUS FOR VEHICLE

(71) Applicant: TOYOTA JIDOSHA KABUSHIKI KAISHA, Toyota-shi, Aichi-ken (JP)

(72) Inventors: Masayuki Baba, Toyota (JP); Takahiko Tsutsumi, Nisshin (JP); Shun Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/971,471

(22) Filed: Dec. 16, 2015

(65) Prior Publication Data

US 2016/0236675 A1 Aug. 18, 2016

(30) Foreign Application Priority Data

Feb. 13, 2015 (JP) .................................. 2015-026295

(51) Int. Cl.
*B60W 20/00* (2016.01)
*B60W 10/02* (2006.01)
*B60K 6/38* (2007.10)
*B60K 6/50* (2007.10)
*F16D 11/00* (2006.01)

(52) U.S. Cl.
CPC .............. *B60W 20/40* (2013.01); *B60K 6/38* (2013.01); *B60K 6/50* (2013.01); *B60W 10/02* (2013.01); *F16D 11/00* (2013.01); *B60Y 2200/92* (2013.01); *B60Y 2300/182* (2013.01); *B60Y 2300/42* (2013.01); *B60Y 2300/43* (2013.01); *B60Y 2300/60* (2013.01); *B60Y 2300/70* (2013.01); *B60Y 2400/421* (2013.01); *Y10S 903/912* (2013.01); *Y10S 903/93* (2013.01)

(58) Field of Classification Search
CPC ..................................................... B60W 20/40
See application file for complete search history.

(56) References Cited

U.S. PATENT DOCUMENTS

| | | | |
|---|---|---|---|
| 2011/0246008 A1* | 10/2011 | Yoshida | B60K 6/48 701/22 |
| 2015/0191168 A1* | 7/2015 | Mitsuyasu | B60W 20/00 701/54 |
| 2016/0200310 A1* | 7/2016 | Amemiya | B60K 6/48 701/22 |
| 2016/0280127 A1* | 9/2016 | Needham | H04N 9/3173 |

FOREIGN PATENT DOCUMENTS

| | | |
|---|---|---|
| JP | 2004-150507 A | 5/2004 |
| JP | 2013-133085 A | 7/2013 |

* cited by examiner

*Primary Examiner* — Tisha Lewis
(74) *Attorney, Agent, or Firm* — Oliff PLC

(57) ABSTRACT

A drive apparatus for a vehicle includes an engine, an MG, a first rotary shaft, a second rotary shaft, a transmission disposed between the first rotating shaft and the second rotary shaft, a driving wheel, a first clutch capable of interrupting power transmission between the engine and the first rotary shaft, a second clutch capable of interrupting power transmission between the MG and the first rotary shaft, and an ECU for controlling the engine, the MG, the transmission, the first clutch and the second clutch. The ECU releases the second clutch as a rotation speed of the first rotary shaft becomes higher than a threshold value, and sets the threshold value lower in the case where an acceleration request is issued from the driver than in the case where no acceleration request is issued to reduce the operation times for the clutch to engage or disengage the MG.

5 Claims, 3 Drawing Sheets

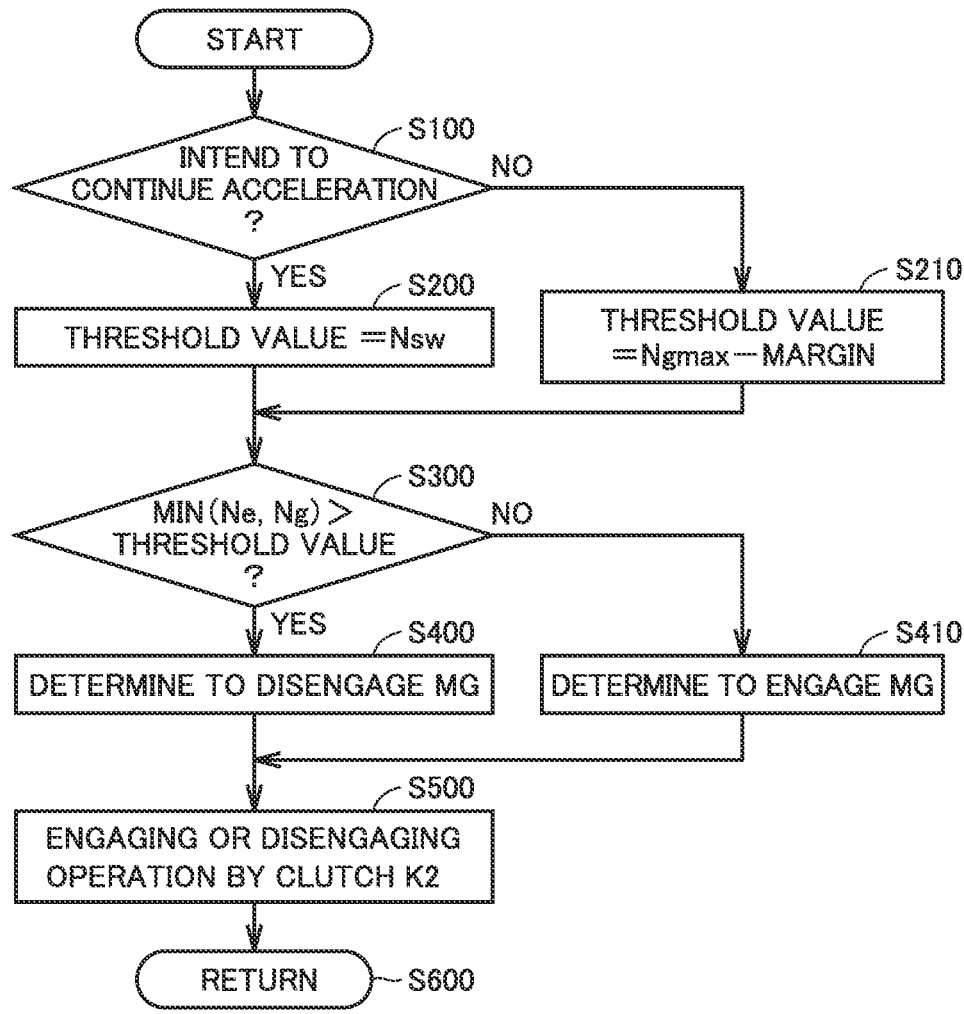

DRIVE APPARATUS FOR VEHICLE

This non-provisional application is based on Japanese Patent Application No. 2015-026295 filed on Feb. 13, 2015 with the Japan Patent Office, the entire contents of which are hereby incorporated by reference.

BACKGROUND OF THE INVENTION

Field of the Invention

The present invention relates to a drive apparatus for a vehicle, and particularly relates to a drive apparatus of a vehicle provided with an engine, a motor generator and a transmission.

Description of the Background Art

Japanese Patent Laying-Open No. 2004-150507 discloses a hybrid vehicle provided with an engine, a motor generator and a transmission. In the hybrid vehicle, the transmission is disposed between a rotary shaft of the motor generator and a ring gear shaft that is mechanically connected to driving wheels and is configured to engage with or disengage from both shafts where necessary. Thereby, in the case where a slip occurs in the hybrid vehicle due to the idle running of the driving wheels, it is possible for the transmission to release the engagement between the rotary shaft of the motor generator and the ring gear shaft so as to detach the motor generator from the driving wheels. Accordingly, it is possible to prevent the motor generator from operating at an excessively large rotation speed due to the slip. As the slip is settled, the transmission engages the rotary shaft and the ring gear shaft at a small gear ratio. As a result, it is possible to prevent the vehicle form slipping again, which is very possible to occur immediately after the previous slip.

However, there is also a possibility that the excessive rotation of the motor generator occurs in the case where the driver is intending to continue the acceleration, which is not discussed by the prior art disclosed in Japanese Patent Laying-Open No. 2004-150507.

For the convenience of design, in a vehicle provided with an engine and a motor generator, it is common that the relationship between the upper limit rotation speed $N_{emax}$ of the engine and the upper limit rotation speed $N_{gmax}$ of the motor generator is designed to satisfy $N_{emax} > N_{gmax}$.

For such a vehicle, in the case where the rotation speed of the engine increases, in order to prevent the motor generator from rotating excessively, it is necessary to disengage the motor generator from the engine shaft before the rotation speed of the engine reaches the upper limit rotation speed $N_{emax}$. Therefore, a clutch (clutch K2 to be described below) is provided in the hybrid vehicle for disengaging the motor generator from the rotary shaft of the engine.

As the vehicle speed is increased in accordance with the intention of acceleration from the driver, the rotation speed of the rotary shaft of the engine will go beyond $N_{gmax}$ and reach $N_{emax}$. Immediately before the rotation speed reaches $N_{gmax}$, the clutch is released, and thereby the motor generator is disengaged from the rotary shaft.

As the driver intends to continue the acceleration and thereby the vehicle speed is further increased, an upshift is performed by the transmission immediately before the rotation speed reaches $N_{emax}$. Due to such operation, the rotation speed of the rotary shaft becomes lower than $N_{gmax}$, and the clutch is engaged again. As the vehicle speed is further increased, the clutch is released again.

As described in the above, in the case where the driver intends to continue the acceleration, the clutch is engaged and disengaged repeatedly in response to the increase in the rotation speed of the rotary shaft during the acceleration and the decrease in the rotation speed of the rotary shaft at the upshift. Such hunting state causes a shock in the vehicle at the time of clutch operation and causes a torque to fluctuate in response to the engagement or the disengagement of the motor generator, which is not preferred.

SUMMARY OF THE INVENTION

The present invention has been accomplished in view of the aforementioned problems, and it is therefore an object of the present invention to provide a drive apparatus for a vehicle so as to reduce the operation times for a clutch to engage or disengage the motor generator.

In summary, the invention provides a drive apparatus for a vehicle which includes an engine, a motor generator, a first rotary shaft and a second rotary shaft, a transmission disposed between the first rotary shaft and the second rotary shaft, driving wheels coupled to the second rotary shaft, a first clutch, a second clutch, and a control unit. The first clutch is capable of interrupting the power transmission between the engine and the first rotary shaft. The second clutch is capable of interrupting the power transmission between the motor generator and the first rotary shaft. The control unit controls the engine, the motor generator, the transmission, the first clutch and the second clutch. The control unit is configured to release the second clutch in the case where a rotation speed of the first rotary shaft is higher than a threshold value. The control unit is configured to set the threshold value lower in the case where an acceleration request is issued from the driver than in the case where no acceleration request is issued.

In the case where the driver continues to request acceleration, the vehicle speed is increased continuously, and thereby the upshift will occur in the automatic transmission for several times. In this case, if the threshold value is fixed to a rotation speed where the motor generator rotates excessively, the engagement and the disengagement of the second clutch will be repeated for several times, causing the hunting to occur, and as a result, shocks may occur in the vehicle, making the driver feel torque variations. Thus, in the case where the driver requests acceleration, the threshold value is set lower.

Setting the threshold value lower is equivalent to expanding the range of disengaging the motor generator from a range A to a range B as illustrated in FIGS. 2 and 3, which will be described later. Thus, even upshift is repeated during the increase in the vehicle speed, since the variation range of the rotary shaft falls into the expanded range B for disengaging the motor generator, the second clutch will not be re-engaged, and thereby it is unlikely for the hunting to occur in the second clutch.

Preferably, the second clutch is a clutch having dog teeth called as the dog clutch. The dog clutch is advantageous in that it is low in price and requires a small installation space but disadvantageous in that the shock occurred in the engagement is great if the gears are not synchronized with the rotation speed. In the case where the driver continues to request acceleration, the vehicle speed will increase continuously and if an upshift is performed at this time, since the rotation speed varies greatly, it is especially difficult to synchronize the gears with the rotation speed. According to the present invention, the second clutch will not be re-engaged at this time, and thus, using the dog clutch as the second clutch is particularly effective.

Preferably, the control unit, in the case where said acceleration request is issued, sets the threshold value higher as the vehicle speed increases. However, lowering the threshold value would make the motor generator be disengaged from the driving wheels earlier, which is disadvantageous in vehicle performance. As the vehicle speed becomes higher, the magnitude of variations in the rotation speed during upshift becomes smaller, by controlling the threshold value as described above, it is possible to increase the chance of using the motor generator to assist torque in high speed range.

Preferably, the control unit determines whether or not the acceleration request is issued based on the settings of a switch or a shift lever to be operated by the driver.

Preferably, the control unit determines that the acceleration request is issued in the case where an accelerator press-down degree has been equal to or greater than a predetermined value over a predetermined time.

According to the present invention, even in the case where an acceleration request is issued by the driver, the motor generator can be prevented from being engaged or disengaged repeatedly each time when a shift change is performed in the transmission, and thereby making the driver feel more comfortable in driving.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart for explaining the controls performed on a clutch K2 in the present embodiment.

DESCRIPTION OF THE PREFERRED EMBODIMENTS

Figure 1:
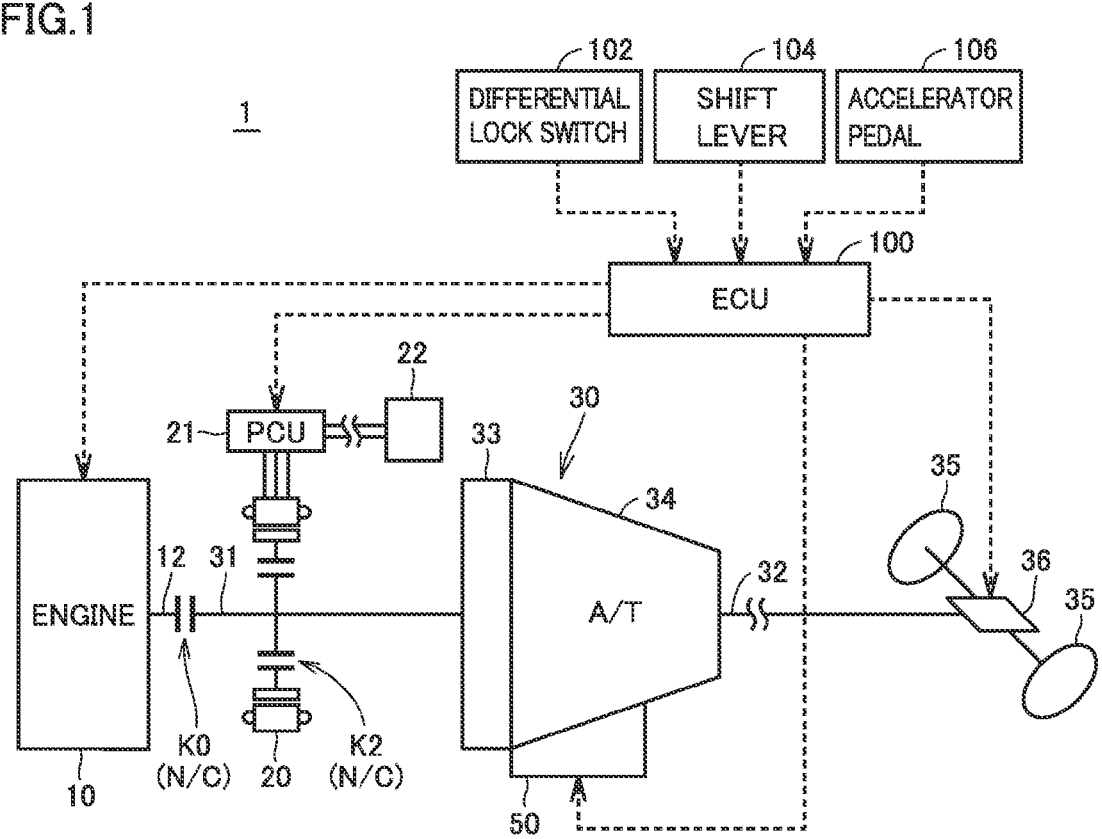
FIG. 1 is a diagram illustrating an overall configuration of a drive apparatus for a vehicle 1 according to the present embodiment.

Hereinafter, an embodiment of the present invention will be described in detail with reference to the drawings. It should be noted that in the drawings the same or corresponding parts will be assigned with the same reference numerals and the description thereof will not be repeated.

FIG. 1 is a diagram illustrating an overall configuration of a drive apparatus for a vehicle 1 according to the present embodiment. The drive apparatus for vehicle 1 includes an engine 10, a motor generator (hereinafter also referred to as "MG") 20, a power control circuit (hereinafter referred to as "PCU") 21, a high-voltage battery 22, an automatic transmission unit 30, a clutch K2, a clutch K0, a hydraulic circuit 50, and an electronic control unit (hereinafter referred to as "ECU") 100.

Vehicle 1 is a hybrid vehicle driven to run by power transmitted from at least one of engine 10 and MG 20 via automatic transmission unit 30 and a differential mechanism 36 to driving wheels 35. Engine 10 is an internal combustion engine such as a gasoline engine or a diesel engine. A rotary shaft 31, which serves as an input shaft of automatic transmission unit 30, is coupled to an output shaft 12 of engine 10 via clutch K0. A rotary shaft 32, which serves as an output shaft of automatic transmission unit 30, is coupled to driving wheels 35. Automatic transmission unit 30 according to the present embodiment includes a torque converter 33 and an automatic transmission 34.

The shift range of automatic transmission 34 is set by the driver via a shift lever 104. The shift range of automatic transmission 34 is selected from a plurality of shift ranges including a forward driving range (D range), reverse driving range (R range), a parking range (P range), and a neutral range (N range). For example, if an IG switch (not shown) is turned off by the user (IG OFF state), the shift range of automatic transmission 34 is set to "P range". In the P range, rotary shaft 32 is fixed (locked for parking) and disengaged from rotary shaft 31 in automatic transmission unit 30.

By using a differential lock switch 102, differential mechanism 36 can be set to a differential lock state in which the rotation speed of both driving wheels is equal.

Typically, MG 20 is constructed from a three-phase permanent magnet synchronous motor. In other words, the rotor of MG 20 is mounted with permanent magnets. The stator of MG 20 is wound with three-phase coils (U-phase coil, V-phase coil and W-phase coil), and the other ends of each of the phase coils are connected to each other at a neutral point.

The rotor of MG 20 is hollow inside, and rotary shaft 31 is inserted therein. Clutch K2 is disposed between the inner surface of the rotor of MG 20 and rotary shaft 31. Thus, the rotor of MG 20 is coupled to rotary shaft 31 via clutch K2. Clutch K2 is preferably a dog clutch having dog teeth. The dog clutch is advantageous in that it is low in price and requires a small installation space but disadvantageous in that the shock occurred in the engagement is great in the case where gears are not synchronized in rotation speed.

MG 20 is driven by electric power of high voltage supplied from high-voltage battery 22 through the intermediary of PCU 21. Meanwhile, MG 20 generates electric power when being rotated by the motive power transmitted from rotary shaft 31 (motive power transmitted from engine 10 or from the driving wheels). High-voltage battery 22 accumulates the electric power to be supplied to MG 20 which operates at high voltage.

PCU 21 is provided with a converter and an inverter. The converter is configured to increase a voltage input from high-voltage battery 22 and output the increased voltage to the inverter or to decrease a voltage input from the inverter and output the decreased voltage to high-voltage battery 22. The inverter is configured to convert a current input from the converter into a three-phase alternating current and output the three-phase alternating current to MG 20 or to convert a three-phase alternating current input from MG 20 into a direct current and output the direct current to the converter.

Hydraulic circuit 50 is configured to regulate the hydraulic pressure of hydraulic oil supplied from an electric oil pump or a mechanical oil pump (not shown) and supply the hydraulic oil with the regulated hydraulic pressure to automatic transmission unit 30, clutch K2 and clutch K0.

Clutch K2 according to the present embodiment is a normally closed clutch (hereinafter referred to as "N/C") which is engaged in normal state where no hydraulic oil is supplied and is released in a state where the hydraulic oil is supplied with a predetermined pressure. Similarly, clutch K0 according to the present embodiment is also an N/C clutch which is engaged in normal state and is released in a state where the hydraulic oil is supplied with a predetermined pressure.

Although not illustrated in the drawings, vehicle 1 is provided with a plurality of sensors for detecting the physical parameters required to control vehicle 1, such as the rotation speed of engine 10 (engine rotation speed $N_e$), a wheel speed $N_w$, a manipulated variable of an accelerator pedal 106 by the user, the rotation speed of MG 20 (MG rotation speed $N_g$), and the rotation speed of rotary shaft 31 (input shaft rotation speed $N_{at}$). These sensors send the detection results to ECU 100.

ECU 100 is configured to include a central processing unit (CPU, not shown) and an internal memory. ECU 100 is activated when the user performs an operation for starting vehicle 1 (an operation of switching an IG switch (not shown) from the OFF state to the ON state, which is hereinafter referred to as "IG ON operation"). ECU 100, when being activated by the IG ON operation, performs predetermined arithmetic computations based on information from the sensors and information stored in memory, and controls each device in vehicle 1 based on the computation results.

ECU 100 controls vehicle 1 to run in any mode of a motor running mode, a hybrid running mode and an engine running mode. If the SOC of the battery is sufficiently high, the vehicle is controlled to run in the motor running mode when the vehicle speed is low (for example, 30 km/h or less) and to run in the hybrid running mode or the engine running mode when the vehicle speed is high (for example, 30 km/h or more).

In the motor running mode, ECU 100 engages clutch K2 (couple MG 20 to rotary shaft 31) and releases clutch K0 (disengage engine 10 from rotary shaft 31) so as to rotate rotary shaft 31 by using the power from MG 20.

In the hybrid running mode, ECU 100 engages both clutch K2 (couple MG 20 to rotary shaft 31) and clutch K0 (couple engine 10 to rotary shaft 31) so as to rotate rotary shaft 31 by using the power from at least one of engine 10 and MG 20.

In the engine running mode, ECU 100 releases clutch K2 (disengage MG 20 from rotary shaft 31) and engages clutch K0 (couple engine 10 to rotary shaft 31) so as to rotate rotary shaft 31 by using the power from engine 10. In this state, since MG 20 is detached from the power train, vehicle 1 functions the same as a normal engine vehicle with an automatic transmission disposed between the engine and the driving wheels.

[Excessive Rotation Avoidance Control on MG 20]

When the hybrid vehicle having the configuration shown in FIG. 1 is running with engine 10 under assistance by MG 20, since clutch K0 and K2 are engaged, the rotation speed of engine 10 is equal to the rotation speed of MG 20.

Although the rotation speed of engine 10 is equal to the rotation speed of MG 20, it does not mean that the upper limit rotation speed of engine 10 ($N_{emax}$) is necessarily equal to the upper limit rotation speed of MG 20 ($N_{gmax}$). Rather than that, since it is difficult to make the upper limit rotation speeds equal to each other, for the convenience of design, it is common to set $N_{emax} > N_{gmax}$.

In such a vehicle, in the case where the rotation speed of the engine increases, in order to prevent the motor generator from rotating excessively, it is necessary to disengage MG 20 from the engine shaft before the rotation speed of the engine reaches the upper limit rotation speed $N_{emax}$.

Figure 2:
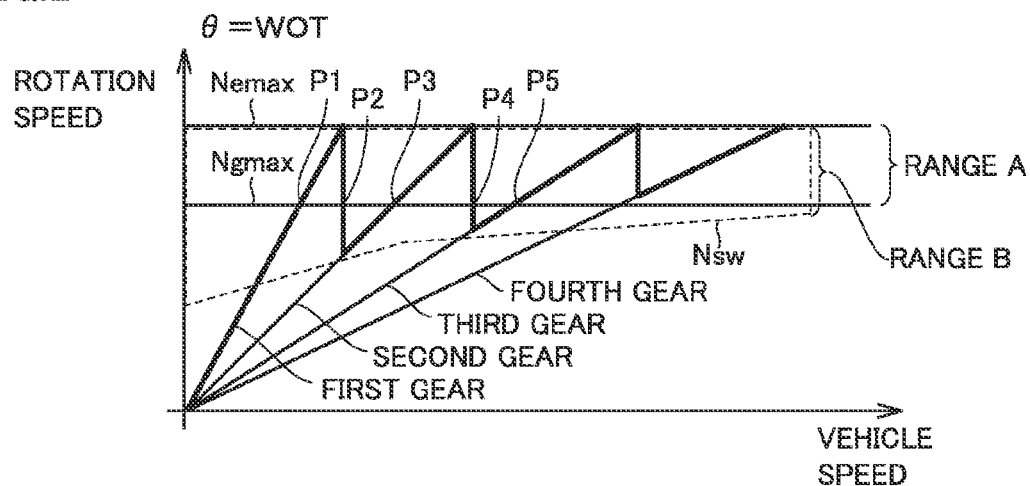
FIG. 2 is a diagram for explaining an MG disengaging range for preventing an MG 20 from rotating excessively.

FIG. 2 is a diagram for explaining an MG disengaging range for preventing MG 20 from rotating excessively. With reference to FIG. 2, the horizontal axis denotes the vehicle speed, and the vertical axis denotes the rotation speed of rotary shaft 31. It should be noted that in the figure, the throttle opening degree is full open, in other words, θ=WOT (Wide Open Throttle). A range between the upper limit rotation speed of engine 10 ($N_{emax}$) and the upper limit rotation speed of MG 20 ($N_{gmax}$) is set as an MG disengaging range A.

Since most vehicles are designed to have $N_{emax} > N_{gmax}$, and thereby, rotary shaft 31 may rotate at a rotation speed greater than $N_{gmax}$. In this case, if clutch K2 is not released so as to disengage MG 20 from rotary shaft 31, MG 20 may rotate excessively.

First, the application of disengaging range A in the case where the vehicle is being accelerated will be described.

While the vehicle speed is being accelerated from zero, as indicated by the bold line in the figure, firstly automatic transmission 34 is set to the first gear, and the rotation speed of rotary shaft 31 will go beyond $N_{gmax}$ and reach $N_{emax}$. In this process, immediately before the rotation speed reaches $N_{gmax}$ (in the vicinity of point P1), clutch K2 is released to disengage MG 20 from rotational shaft 31.

When the vehicle speed is further increased, automatic transmission 34 shifts up from the first gear to the second gear immediately before the rotation speed in the first gear reaches $N_{emax}$. In response to the upshift, the rotation speed of rotary shaft 31 suddenly drops and becomes lower than $N_{gmax}$ in the vicinity of point P2, clutch K2 is engaged again.

When the vehicle speed is further increased with automatic transmission 34 at the second gear, clutch K2 is released in the vicinity of point P3, after being shifted up to the third gear, clutch K2 is engaged in the vicinity of point P4. When the vehicle speed is further increased at the third gear, clutch K2 is released again in the vicinity of point P5. When automatic transmission 34 shifts up from the third gear to the fourth gear, the decline (gear step) in the rotation speed along with the upshift is small, MG 20 is kept at the disengaged state.

As described in the above, clutch K2 is engaged and disengaged repeatedly in response to the increase in the rotation speed of rotary shaft 31 during acceleration and the decrease in the rotation speed of rotary shaft 31 at the upshift. Such hunting state causes a shock in the vehicle at the time of clutch operation and causes a torque to fluctuate in response to the presence or absence of MG 20, which is not preferred.

In particular, when an upshift occurs at point P2 or point P4, the engine rotation speed $N_e$ fluctuates rapidly, and thereby, it is relatively difficult to synchronize the rotation speed of MG 20 with the rotation speed of rotary shaft 31 for engaging clutch K2. Accordingly, a shock may occur due to the unsuccessful synchronization of the rotation speed in engaging clutch K2, the over output may occur due to the sudden change in the rotation speed of MG 20 in engaging clutch K2, and the life time of clutch K2 may be deteriorated due to the slip in engaging clutch K2.

Therefore, according to the present embodiment, in the case where the driver intends to continue the acceleration and the rotation speed changes repeatedly around the rotation speed $N_{gmax}$, the MG disengaging range is expanded from the disengaging range A to the disengaging range B. Specifically, as illustrated in FIG. 2, the lower speed boundary of the rotation speed in the MG disengaging range is changed from $N_{gmax}$ to $N_{sw}$ indicated by the broken line.

$N_{sw}$ is a boundary value for determining the engagement and the disengagement of clutch K2, and may be obtained for each throttle opening degree by applying a margin to a line connecting those points at which the rotation speed drops at the upshift.

Note that $N_{sw}$ may be determined based on an estimated engagement-lasting time of clutch K2 during acceleration.

In the present embodiment, as illustrated in FIG. 2, the rotation speed $N_{sw}$ for detaching the motor generator is set lower than the engine rotation speed after the upshift. Thereby, even if the vehicle speed increases as illustrated by the bold line in FIG. 2, the application of the MG disengaging range B can prevent the hunting from occurring in clutch K2 due to the repeated engagement and disengagement, and consequently, prevent shocks from occurring in the vehicle and prevent the life time of clutch K2 from being reduced.

In FIG. 2, the throttle opening degree is set equal to WOT, but the throttle opening degree is not limited to WOT. The MG disengaging range can be expanded in the same manner as long as the rotation speed of rotary shaft 31 is accelerated beyond $N_{gmax}$.

Figure 3:
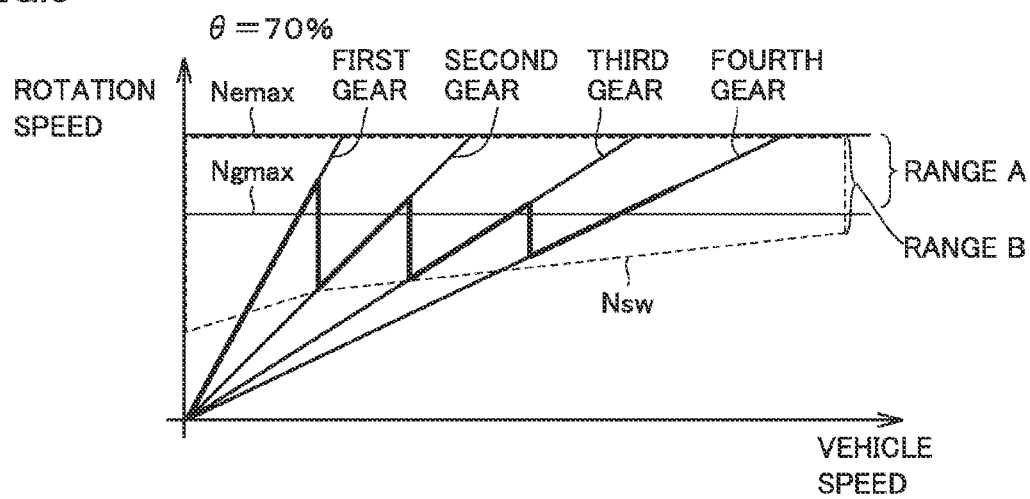
FIG. 3 is a diagram showing an example where the throttle opening degree is smaller than that in FIG. 2.

FIG. 3 is a diagram showing an example where the throttle opening degree is smaller than that in FIG. 2. In FIG. 3, the throttle opening degree is for example 70%. Comparing FIG. 3 to FIG. 2, the magnitude of changes (gear step) in the rotation speed during upshift in the case where the throttle opening degree is 70% is smaller than that in the case where the throttle opening degree is WOT. However, even in this case, the rotation speed of rotary shaft 31 will change across $N_{gmax}$ when being upshifted.

Therefore, even in the case where the rotation speed changes as illustrated by the bold line in FIG. 3, the clutch is controlled by expanding the MG disengaging range from range A to range B.

Based on the above description, the present embodiment will be described with reference to FIG. 1 again. The drive apparatus for a vehicle of the present embodiment includes engine 10, MG 20, rotary shafts 31 and 32, automatic transmission 34 disposed between rotary shaft 31 and rotary shaft 32, driving wheels 35 coupled to rotary shaft 32, clutch K0, clutch K2, and ECU 100. Clutch K0 is capable of interrupting the power transmission between engine 10 and rotary shaft 31. Clutch K2 is capable of interrupting the power transmission between MG 20 and rotary shaft 31. ECU 100 controls engine 10, MG 20, automatic transmission 34, clutch K0 and clutch K2. ECU 100 is configured to release clutch K2 in the case where the rotation speed of rotary shaft 31 is higher than a threshold value. ECU 100 is configured to set the threshold value lower in the case where an acceleration request is issued from the driver than in the case where no acceleration request is issued.

In the case where the driver continues to request acceleration, the vehicle speed is increased continuously, as illustrated in FIGS. 2 and 3, the upshift will occur in automatic transmission 34 for several times. In this case, if the threshold value is fixed to a rotation speed where MG 20 rotates excessively, the engagement and the disengagement of clutch K2 will repeat for several times, causing the hunting to occur, and as a result, shocks may occur in the vehicle, making the driver feel torque variations. Thus, in the case where the driver requests acceleration, the threshold value is set lower so as to prevent the hunting from occurring in clutch K2 as much as possible.

Preferably, clutch K2 is a clutch having dog teeth called as a dog clutch. The dog clutch is advantageous in that it is low in price and requires a small installation space but disadvantageous in that the shock occurred in the engagement is great in the case where the gears are not synchronized with rotation speed. In the case where the driver continues to request acceleration, the vehicle speed will increase continuously, if an upshift is performed at this time, since the rotation speed varies greatly, it is especially difficult to synchronize the gears with the rotation speed.

According to the present invention, clutch K2 will not be re-engaged at this time, and thereby, using the dog clutch as clutch K2 is particularly effective.

Preferably, in the case where said acceleration request is issued, ECU 100 sets the threshold value $N_{sw}$ higher as the vehicle speed increases. However, lowering the threshold value would make MG 20 be disengaged from driving wheels 35 earlier, which is disadvantageous in vehicle performance. As the vehicle speed becomes higher, the magnitude of variations in the rotation speed during upshift becomes smaller, by controlling the threshold value as described above, it is possible to increase the chance of using MG 20 to assist torque in high speed range.

Next, with reference to a flowchart in FIG. 4, the controls performed by ECU 100 will be described. FIG. 4 is a flowchart for explaining the controls performed on clutch K2 in the present embodiment. The process of the flowchart is invoked from a predetermined main routine and performed each time after a predetermined time interval has passed or a predetermined condition is satisfied.

With reference to FIGS. 1 and 4, when the process of the flowchart is started, firstly at step S100, ECU 100 determines whether or not the user intends to continue the acceleration. Preferably, ECU 100 determines whether or not the acceleration request is issued based on the settings of a switch or a shift lever to be operated by the driver. ECU 100 may determine that the user continues to request acceleration in the case where a switch designed for powerful acceleration (such as differential lock switch 102) is operated or the shift lever is transferred to L range. Alternately, ECU 100 may determine that the user continues to request acceleration in the case where an accelerator press-down degree has been equal to or greater than a predetermined value over a predetermined time.

In the case where it is determined that the user does not intend to continue the acceleration at step S100 (NO at S100), the process proceeds to step S210. At step S210, the threshold value is set to a value with a margin being subtracted from $N_{gmax}$ as illustrated in FIGS. 2 and 3. The margin can be a value estimated from the acceleration and the released interval of clutch K2.

On the other hand, in the case where it is determined that the user intends to continue the acceleration at step S100 (YES at S100), the process proceeds to step S200. At step S200, the threshold value is set to $N_{sw}$ as illustrated in FIGS. 2 and 3.

Threshold value $N_{sw}$ is obtained for each throttle opening degree as illustrated in FIG. 2 and FIG. 3 by subtracting a margin from the line connecting those points defined by a rotation speed of rotary shaft 31 which drops from a high rotation speed at the moment when an upshift is performed and the vehicle speed of the same moment.

After the threshold value is determined at step S200 or S210, whether or not the smaller one of the engine rotation speed $N_e$ and the rotation speed $N_g$ of MG 20 is greater than threshold value $N_{sw}$ is determined at step S300. The reason for comparing both the engine rotation speed $N_e$ and the rotation speed $N_g$ of MG 20 is because that $N_g = N_e$ when clutch K2 is being engaged, and thus the determination may be performed according to $N_g$, but when clutch K2 is being released, clutch K2 should be engaged under such a condition that both $N_e$ and $N_g$ are not more than the threshold value.

In the case where $MIN(N_e, N_g) >$ threshold value $N_{sw}$ is satisfied at step S300 (YES at S300), the process proceeds to step S400 where it is determined to disengage MG 20 from rotary shaft 31. On the other hand, in the case where MIN($N_e$, $N_g$)>threshold value $N_{sw}$ is not satisfied at step S300 (NO at S300), the process proceeds to step S410 where it is determined to couple clutch K2 so as to engage MG 20 to rotary shaft 31.

After the determination is made at step S400 or step S410, ECU 100 controls hydraulic circuit 50 to engage or disengage clutch K2 in response to each determination result obtained in the above at step S500. At a subsequent step S600, the control process returns to the main routine.

As described above, according to the present embodiment, the range for disengaging MG 20 is changed based on whether or not the driver continues to request acceleration. Thereby, it is possible to prevent the hunting from occurring during the engagement and disengagement of clutch K2 in the case where the driver continues to request acceleration.

Moreover, as illustrated in FIGS. 2 and 3, the boundary of MG disengaging range B increases as the vehicle speed becomes higher, and thereby, it is possible to expand the available range for MG 20.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A drive apparatus for a vehicle, comprising:
   an engine;
   a motor generator;
   a first rotary shaft and a second rotary shaft;
   a transmission disposed between said first rotating shaft and said second rotary shaft;
   a driving wheel coupled to said second rotary shaft;
   a first clutch capable of interrupting power transmission between said engine and said first rotary shaft;
   a second clutch capable of interrupting power transmission between said motor generator and said first rotary shaft; and
   a control unit for controlling said engine, said motor generator, said transmission, said first clutch, and said second clutch,
   said control unit being configured to release said second clutch in the case where a rotation speed of said first rotary shaft is higher than a threshold value, and
   said control unit being configured to set said threshold value lower in the case where an acceleration request is issued from the driver than in the case where no acceleration request is issued.

2. The drive apparatus for a vehicle according to claim 1, wherein
   said second clutch is a clutch having dog teeth.

3. The drive apparatus for a vehicle according to claim 1, wherein
   said control unit, in the case where said acceleration request is issued, sets said threshold value higher as the vehicle speed increases.

4. The drive apparatus for a vehicle according to claim 1, wherein
   said control unit determines whether or not said acceleration request is issued based on the settings of a switch or a shift lever to be operated by the driver.

5. The drive apparatus for a vehicle according to claim 1, wherein
   said control unit determines that said acceleration request is issued in the case where an accelerator press-down degree has been equal to or greater than a predetermined value over a predetermined time.

* * * * *